April 7, 1959    H. FELD ET AL    2,880,653
PLANING, SHAPING OR THE LIKE MACHINES
Filed Dec. 3, 1956    3 Sheets-Sheet 2
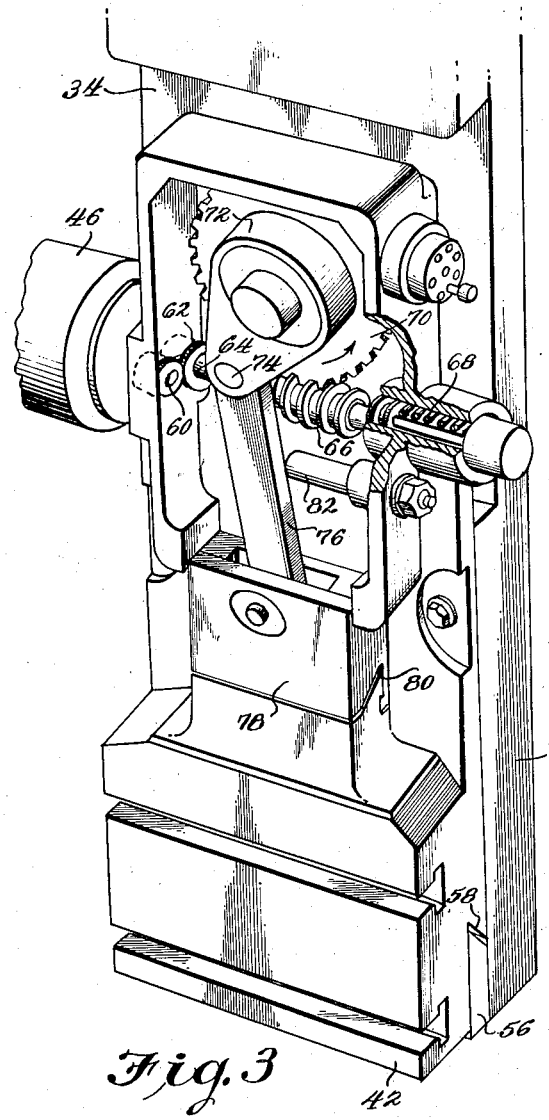
INVENTORS
W. Lapp, Deceased,
By Gertrud Lapp
Legal Representative,
Heinrich Feld
BY
Glascock Downing Reebold
ATTORNEYS

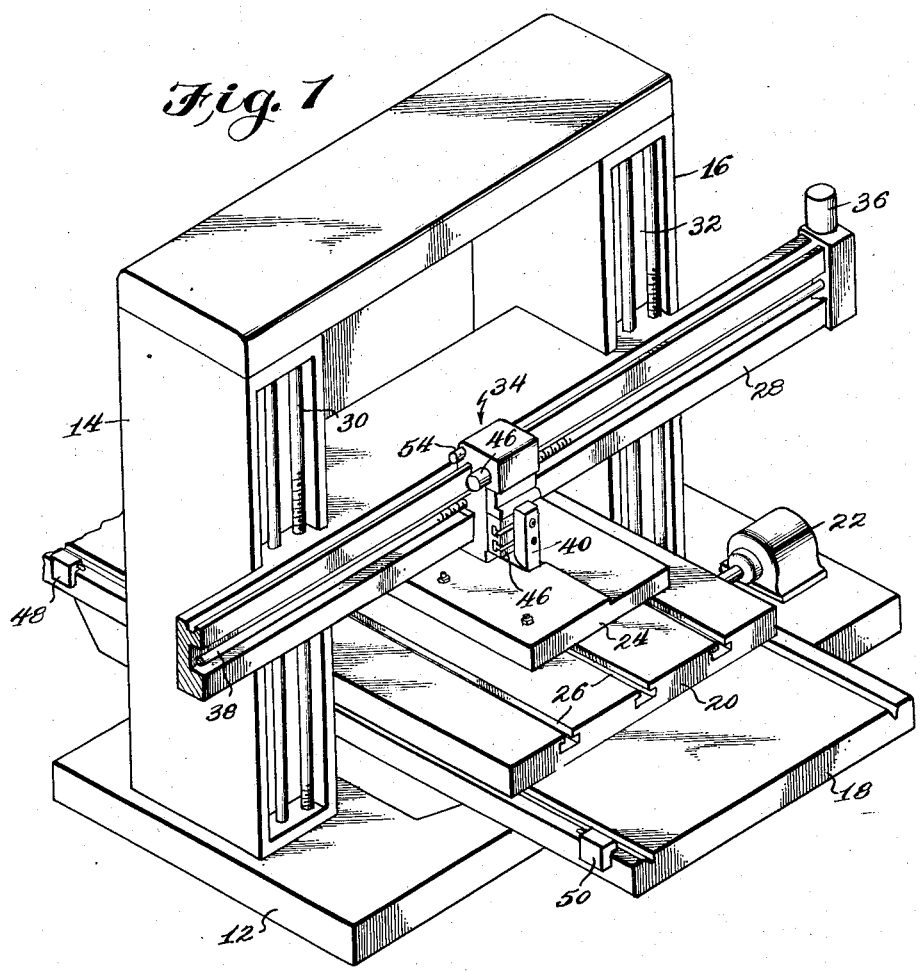

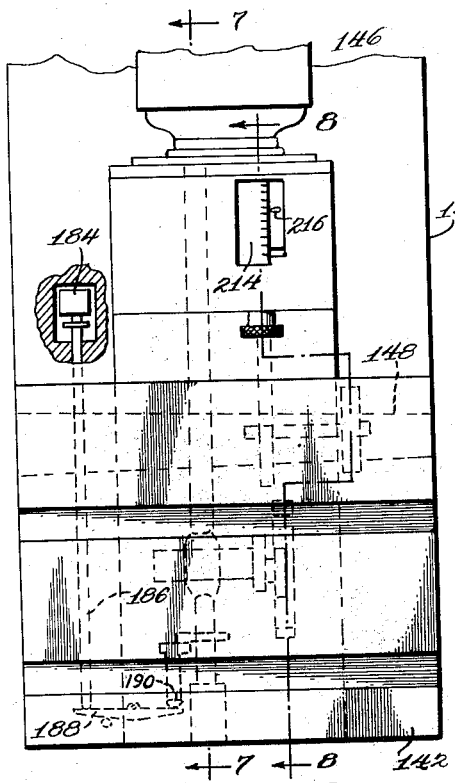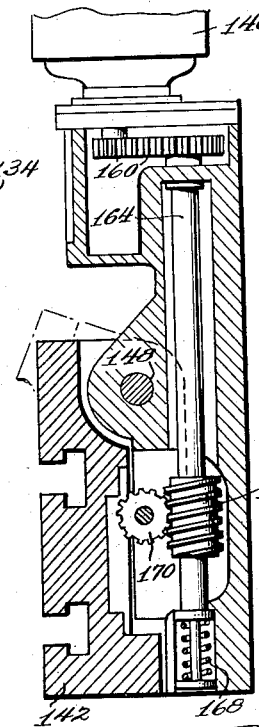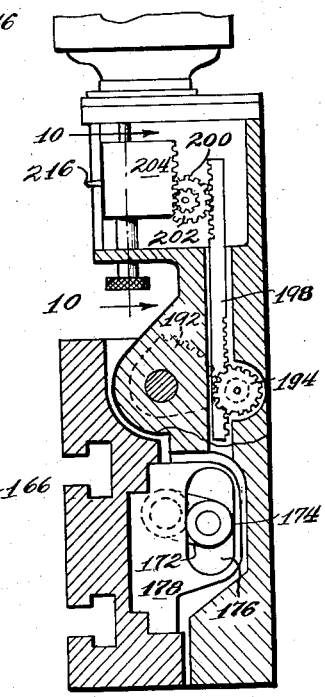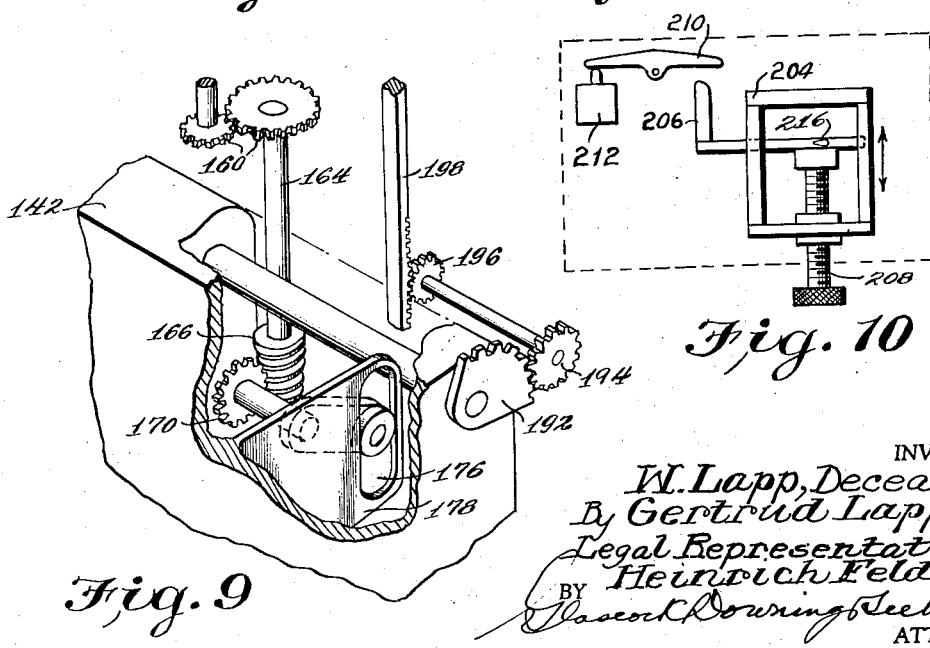

2,880,653

PLANING, SHAPING OR THE LIKE MACHINES

Heinrich Feld, Siegen, Westphalia, and Wilhelm Lapp, deceased, late of Siegen, Westphalia, by Gertrud Lapp, Siegen, Westphalia, Germany, heir and legal representative Application December 3, 1956, Serial No. 625,983

Claims priority, application Germany April 30, 1951

13 Claims. (Cl. 90—55)

This invention pertains to machine tools, and particularly to machines of this kind in which a tool such as a chisel is moved relatively to a workpiece to effect a planing, grooving or like operation.

Machines of the above type as known in the prior art require that during the reverse stroke, the tool or chisel be lifted away from the working face, or at any rate, so disposed that cutting is effected in only the working direction. Thus, a common feature of the tool holder has been the so-called clapper construction, in which the tool is held in or on a pivoted support which, during reverse or idle strokes, is allowed to pivot so that the tool is lifted away from the work. By suitable design, it is easy to arrange that the chisel falls back to its cutting position prior to commencement of the next working or cutting stroke. In discussing the problem, it will be realized that it is immaterial whether the workpiece or the tool actually moves, so long as the necessary relative motion is achieved.

These arrangements, and others that have hitherto become known, suffer from the drawback that the chisel is not rigidly locked in the working position, but is pressed only by the cutting pressure originating at the start of the chisel cut and due solely to the force reaction of the workpiece during the cutting stroke. The value of the cutting pressure thus varies with the cutting resistance, and the exact positioning of such a chisel holder on the support, owing to the absence of rigid locking, is not unconditionally assured. In this manner small motions of the tool can originate which generally amount to mere fractions of a millimeter, yet which are sufficient to damage hard metal tools as used in modern practice, after only a short time of use, wearing them out prematurely and even sometimes destroying them completely.

The principal object of the present invention is an installation for moving and locking a chisel holder in planing machines, which arrangement serves the purpose of rigidly locking the chisel holder in its support during the cutting stroke, and independently of the cutting reaction force.

According to the invention, this aim is attained by the fact that the abutting pressure of the chisel holder against its support, suitably mounted as usual in the cross member, is initiated prior to the commencement of the cutting operation, and is exerted by the drive of the chisel holder. In this construction the pressure selected must be higher than the force tending to lift the chisel holder from the support. In this manner the reliable and rigid locking aimed at by the invention is assured. The installation, in a further improvement of the invention, is expediently realized by the structural use of a crank drive between support and holder, the crank drive being intended to be a part of the driving device arranged between support and holder and being so fitted in the same that in the locked operating position of the chisel holder the crank drive is positioned just above dead center. By this employment of the crank drive in its dead center position, a high clamping force is obtained in spite of the use of only a small driving force, for example, by a small motor, because the dead center position creates a very favorable transmisison ratio.

Another improved feature of the invention consists in providing in the drive a self-locking worm gearing, the worm of which is constructed for lengthwise sliding and in turn rotates the crank drive. In order that a motion of the crank drive which requires only a small driving force may be at all possible, a pressure spring opposing the lengthwise displacement of the worm is provided, which spring holds the worm in its axial position at the low load resulting from the motion of the chisel holder. The worm, according to the invention, is arranged so as to be axially displaced upon the chisel holder, abutting against a stop provided on the support, by the force of the spring which is designed to be weaker than the force of the drive motor. The latter force, as stated above, is to be so selected that a rigid locking of the chisel holder itself at highest cutting force is assured. After the chisel holder abuts the support, the lengthwise displacement of the worm will start and simultaneously the spring will be compressed. In this construction the force of the spring, in its compressed condition, which corresponds to the working position of the chisel holder locked to the support, is made of such value that the principal requirement according to the invention is complied with; that is, the pressure of the chisel holder abutting against the support is higher than the force tending to lift the chisel holder from the support.

The described arrangement of a lengthwise displaceable worm and of a spring holding the same in its low load position has the additional advantage that the lengthwise motion of the worm can be used for switching off the drive motor of the chisel holder. The above mentioned employment of a crank drive for driving the chisel holder presents the particularly favorable possibility of constructing the chisel holder as a chisel slide; i.e., to displace same in a straight line in corresponding guides provides on the support, the displacement according to the invention being intended to take place in such a manner that the chisel holder (now constructed as a chisel slide) can be lifted vertically from the plane of the workpiece to be operated on. This vertical lifting is of the greatest importance because it represents the best utilization of the stroke motion of the chisel holder, the stroke length agreeing with the motion path itself; while in the known clapper-type chisel holders the clearance distance of the chisel point from the workpiece amounts to only a fraction of the total path travelled by the point. Therefore with a chisel slide according to the invention one can readily cut deeper grooves in the workpiece.

In order to attain the rigid locking of the chisel slide against the support, it is also proposed to employ a wedge-shaped abutment face on the chisel slide on one hand, and a corresponding counterface on the support on the other hand. The locking is further improved if one provides not only on their lower abutment faces between chisel slide and support such a wedge lock, but if also at the upper part of the chisel slide a corresponding counterface is provided which supplements the above mentioned wedge face to effect a dovetail shape, it being of course necessary to provide a corresponding counterface also on that part of the drive which cooperates with the chisel slide.

With the above objects of the invention in mind, the preferred embodiments of suitable constructions will best be understood by referring now to the accompanying drawings, in which:

Fig. 1 is a perspective view, largely simplified and diagrammatic, of a complete planing machine embodying the inventive concepts.

Fig. 2 is a schematic wiring diagram illustrating suitable control circuits for the various motors employed in such a machine.

Fig. 3 is a fragmentary perspective view, partly broken away, of a complete chisel or tool holder in accordance with a first preferred form of the invention.

Fig. 4 is a vertical section view of a portion of Fig. 3, to a larger scale.

Fig. 5 is an enlarged side view of a portion of Fig. 3, looking at the lower part of the right side of that figure.

Fig. 6 is a front elevation, partly broken away, of a modified form of the invention as applied to a clapper type tool holder.

Fig. 7 is a vertical sectional view thereof, taken on line 7—7 of Fig. 6.

Fig. 8 is another vertical sectional view of this form of the invention, but taken along the broken line 8—8 of Fig. 6.

Fig. 9 is a fragmentary perspective view, partly broken away, of the clapper swinging mechanism of this form of the invention.

Fig. 10 is a diagrammatic sectional view, to a larger scale, of the indicating mechanism shown at the top of Fig. 8, the direction of view being indicated by arrows 10—10 in Fig. 8.

Referring first to Fig. 1 of the drawing, a typical planing machine of the type with which the invention is concerned is illustrated in perspective, so that the environment of the present invention can readily be understood. The showing is simplified as far as possible to avoid complication, and it will be understood that the machine as a whole is intended to be typical of such constructions. Briefly, the planing machine is mounted upon a base 12, from which rise two vertical columns 14 and 16, defining between them a space for a table 18. Upon this table is slidably mounted the carriage 20, which can move back and forth upon table 18 under the driving power of a reversible motor 22. Upon the table is mounted the workpiece 24, secured as usual by bolts passing into T-slots such as 26 provided in the table. Thus, the workpiece can be caused to reciprocate relative to the tool and its holder, now to be described.

Mounted upon and athwart the vertical columns 14 and 16 is a cross beam 28. As is conventional, provision is made for raising and lowering this cross beam under power, and such provision is indicated in Fig. 1 by the vertical lead screws 30, 32 suitably mounted in the columns and arranged to be power driven. Thus, cross beam 28 can be raised and lowered to adjust the depth of each cut. This cross beam also constitutes a support for the tool head generally indicated by numeral 34, which latter can slide lengthwise of the cross beam to different positions, for example between successive cuts in planing a wide area of the workpiece. A motor 36 is mounted at one end of the cross beam, and drives a lead screw 38, for example, to which tool head 34 can be engaged as by usual half nuts or other arrangement. Thus, positioning of the tool head for making a particular cut, or for progressively indexing the tool head for successive cuts, may be achieved.

The tool head indicated as a whole by numeral 34 forms the essential component embracing the present invention. The tool itself is here indicated as a chisel 40, secured to a movable slide tool holder 42 as by bolts whose heads are engaged in usual T-slots in the tool holder 42. According to the invention, means are provided for removing (by raising or swinging) the tool 40 away from the workpiece during the idle or non-cutting stroke of carriage 20, and returning it to the proper cutting position before the succeeding cutting stroke is commenced. A small reversible electric motor 46 mounted on head 34 is provided for this purpose.

For present purposes, the description of the machine as a whole has been simplified greatly. Among other conventional features that such a machine would normally include are clamping motors for rigidly maintaining the cross beam 28 and tool head 34 in desired positions during each cut. The operation of these clamping motors will be synchronized with the machine operations by means well known to those skilled in this art.

Fig. 2 indicates schematically the form which the electrical control arrangements may take. Here the moving carriage is again indicated by numeral 20, being driven by the motor 22. Limit switches such as indicated at 48 and 50 cause this motor to reverse at the desired end positions of the carriage, the switches controlling the motor through conventional relays, contactors or the like included in the control mechanism indicated generically at numeral 52. Such switches may be adjustably mounted, as shown in Fig. 1, upon the table 18 of the equipment, to define the desired stroke length.

Control apparatus 52 is also shown in Fig. 2 as controlling the succession of forward and reverse energizations of the tool head motor 46 in proper timed relation to the traverse motions of carriage 20, to raise and lower the tool 40 for idle and working strokes respectively. Also, a motor 54 is shown as controlled from the same apparatus for the purpose of clamping and unclamping the entire tool head 34 on cross beam 28. This motor is also indicated in Fig. 1 by the same number. It will be understood that similar driving and clamping motors for the other movable parts of the machine may be provided but since the same form no essential part of the present invention, they are not shown in detail.

Before proceeding with the detailed description of particular embodiments of the invention, certain generic features will be mentioned. In both of the two forms to be described, the tool (chisel or the like) is fixedly mounted upon a member which can be moved (between the working stroke and the idle stroke) so as to remove the cutting point, at least, from the workpiece during the idle stroke. In one case, the direction of removal is vertically upward, and in the other it is a swinging movement such as used in the conventional clapper type of tool holder. However, in either case, means are provided for positively locking the tool in proper position, relative to the workpiece, before commencement of each working stroke. This is what ensures that the tool's working position is not dependent upon the magnitude of the force reaction produced when the tool commences its cut, and provides increased tool life, tool safety, and a better finish than known to the prior art. In both embodiments, the control motor for achieving the tool motion (as between clamping and unclamping) operates through a worm drive, so arranged that when the desired clamping force of the tool holder against a stationary part of the tool head has been achieved, further rotation of the worm will thrust it axially against a spring package. The terminal movement of the tool holder operates a limit switch to discontinue clamping movement of the tool control motor.

The worm drive itself does not furnish the ultimate clamping action. In each case, the worm wheel driven by the worm is connected to a crank which in turn produces the desired sliding or tilting movement of the tool holder, and the geometry of the constructions is such that the crank is approximately at dead center when the motor is stopped. The rigidity of clamping can thus be very high, even when a low-powered motor is employed. The motor is reversed, by sequencing control already described, after the completion of each working stroke, to raise the tool away from the work during or before the idle stroke. Means comprising an additional limit switch are optionally provided to establish a variable limit for the upward (away from cutting position) movement of the tool, so that deep cuts can be made when desired, yet shallow cuts can be made in rapid succession without requiring undesirably long periods for the movement of the tool between its idle and working positions. The provision of the axially movable worm, operating against a spring or spring assembly or package of predetermined spring constant, provides assurance that the force holding the tool in its cutting position will be greater by any desired margin than the reaction forces encountered as a result of cutting the workpiece. Hence, the position of the cutting tool will be substantially independent of variations in the cutting resistance.

Additionally, the provision of the spring package as a relief for the thrust upon the worm axle (when the tool holder abuts against the solid resistance of the tool head body) permits the motor to be easily reversed when the tool is to be withdrawn. The significance of this last feature will be appreciated when it is realized that in a worm drive, as in many high-friction drives, the use of one hundred percent of the available motor torque for forward drive to jamming condition would normally prevent reverse drive, because the static friction is ordinarily somewhat higher than the running friction.

Turning now to Figs. 3, 4 and 5 of the drawings, the first and preferred form of the invention is illustrated in detail. The general designation for the tool head is again the numeral 34, the tool holder being indicated by numeral 42, and the chisel (shown only in Fig. 5) by numeral 40. The tool holder is a vertically slidable block provided with the usual T-slots for mounting the chisel. It slides upon a bed forming the body of the tool head 34. At the bottom of head 34, as shown in Figs. 3 and 5, a wedge strip 56 is mounted, for cooperating with a chamfered edge 58 on the holder 42 when the latter is in its lowermost position, to clamp the holder firmly in face contact with the body of the tool head.

The tool holder 42 is moved upwardly and downwardly upon the face of the tool head by motor 46. The motor drives a pinion 60 meshing with a gear 62 secured to a worm shaft 64 carrying the worm 66, the other end of shaft 64 abutting the spring device 68. The spring device is tensioned to urge shaft 64 to the left in Fig. 3, and the spring tension is adjustable. Any suitable provision may be made to permit the small end play of shaft 64, for example the width of gear 62 may permit such action. Meshing with worm 66 is the worm wheel 70, to which is firmly secured the crank 72, the crank pin 74, of which is connected to a link 76 whose lower end is pivoted on the block 78. These latter parts are also visible in Fig. 5, which illustrates the inclined face 80 at the mating surfaces of block 78 and tool holder 42. When block 78 is pressed downwardly so that the chamfered edge 58 engages the wedge strip 56, then the canted face 80 also urges the slide 42 against the tool head base, and the result is a very rigid connection between the tool head and the tool holder.

As has been stated, the geometry of the device is such that when the tool holder slide 42 is in its lowermost or cutting position, the crank is almost at dead center. This condition is shown in Fig. 3. A spring device in the nature of a bumper 82 prevents any possibility of driving the crank or link past dead center, as this would of course loosen the tool holder, and unless corrected might result in damage to the parts. When the cutting stroke is completed, as above described, the motor 46 is reversed to draw slide 42 upwardly again.

In order to shut off the motor 46 when the tool slide 42 has reached its clamped cutting position, a limit switch 84 is fixed within the casing of the tool head, and arranged to be operated by a longitudinal displacement of worm 64 when the latter reaches a position corresponding to the working position of the tool or chisel. In view of the spring relief provided for the worm shaft, over-run of the motor 46 after the switch 84 opens can do no damage.

To shut off operation of the motor 46 in the reverse direction, that is, when the tool has been raised away from its cutting position, a limit switch 86 is provided, suitably mounted in the casing. To permit adjustment of the upward travel limit of the tool between cutting strokes, the mechanism shown in Fig. 4 is provided. Carried by the same shaft that mounts worm wheel 70 is a gear or sector 88, lying behind worm wheel 70 which is partly broken away in Fig. 4 to reveal it. This gear 88 meshes with a gear 90 mounted to turn a bevel gear 92 and in turn the bevel pinion 94. The latter is mounted on a shaft 96 passing through a hollow shaft 98 in the casing wall, and at its outer end shaft 96 is secured to a disc 100 containing several spaced holes. A headed pin 102 in a rotatable outer drum 104 is engaged selectively with one of these holes, by lifting the pin against the pressure of a spring 106, rotating the drum to a selected position, and then releasing the pin to engage with one of the disc holes. The drum 104 is connected to a ring 108 keyed to the hollow shaft 98, whose inner end carries a cam disc 110 arranged to operate the limit switch 86 at one point in its rotation. In this way, the position of crank 72 at which the limit switch will operate to shut off the up-drive of motor 46 can be adjusted at will.

As has been stated, the inventive principles can also be applied to the hinged or clapper form of tool holder, and such an embodiment is illustrated in Figs. 6 through 10 of the drawings. The body of the tool head (corresponding to 34 in the previous form) is designated 134, and the actual tool holder 142. The motor 146 provides the power for swinging the tool holder about its pivot pin 148, shown in Fig. 6 as a taper pin. The tool holder is shown in all the figures as in its lowered (working or cutting) position, but the up-tilted position is suggested by dash lines in Fig. 7. Motor 146 drives through gears 160 a vertical worm shaft 164 bearing worm 166, the shaft having again a spring axial relief 168. The worm wheel 170 is directly connected to a crank 172 (Figs. 8 and 9) whose roller 174 slides in a slot 176 in a web or portion 178 integral with or secured to the pivoted holder 142. The relationship of the gears and crank is plainly visible in Fig. 9, which however is not drawn to scale but merely to clarify the arrangement.

After the tool holder has reached its working position, that is, after its downward displacement, and abuts its stop, motor 146 turns gears 160, vertical worm shaft 164 and worm 166 and the latter moves downwards so that the end of shaft 164 compresses spring 168. On shaft 164 is secured a suitable collar or the like which imparts downward motion to cam plunger 190 so as to raise the lefthand end of lever 188 to displace rod 186 upward to actuate limit switch 184 to interrupt motor 146. Thus, after spring 168 has been compressed sufficiently and supplies the clamping force for fixing the tool holder, the drive motor 146 is switched off.

Provision is made in this form also for adjusting the extent of drive of motor 146 in the upward or lifted condition of the tool holder. Thus, as indicated in Figs. 8 and 9, the swinging holder carries a sector gear 192 meshing with a gear 194 which drives through a common shaft a second gear 196 engaging a vertically slidable rack bar 198. At its upper end, within a housing just beneath drive motor 146, the rack bar meshes with a gear 200 on a common shaft with a gear 202 driving through rack teeth a vertically guided carriage 204. The position of the carriage thus indicates the amount of angular swing of the tool holder from its clamped position. As detailed in Fig. 10, which is again not to scale but provided for clarity, the carriage 204 has an adjustable finger 206 whose vertical position can be adjusted by a thumb screw 208 extending below the bottom wall of the housing beneath motor 146. The finger 206 can engage a rocker arm 210 to operate the upward drive limit switch 212. Thus, the position to which the motor can swing tool holder 142 can readily be set, and the amount of adjustment can readily be seen by inspecting against a scale 214 (Fig. 6) a fiducial mark 216 carried on the stop 206.

While the invention has been described herein in connection with certain preferred embodiments, it is to be understood that these are exemplary of possible constructions, and that the invention is intended to cover such obvious changes and additions as fall within the scope of the appended claims.

What is claimed is:

1. In a planing, shaping or like machine the alternate strokes of whose tool are working strokes and non-working return strokes, and of the type in which the tool is lifted from the work piece during the return strokes, the combination of a reciprocable tool head, a tool holder mounted on said head for movement toward and away from the work piece between a working position and a retracted position, mechanism for positively moving said holder between its two said positions in timed relation to the working and return strokes of said head, said mechanism including a non-reversible drive connection to said holder to positively hold said holder in its working position and said drive connection including a crank mechanism which is at least near a dead center position when the tool holder is in working position.

2. In a planing, shaping or like machine the alternate strokes of whose tool are working strokes and non-working return strokes, and of the type in which the tool is lifted from the work piece during the return strokes, the combination of a reciprocable tool head, a tool holder mounted on said head for movement toward and away from the work piece between a working position and a retracted position, mechanism for positively moving said holder between its two said positions in timed relation to the working and return strokes of said head, said mechanism including a non-reversible drive connection to said holder to positively hold said holder in its working position and an adjustable limit device actuated by the retracting movement of the tool holder to stop the drive when the tool holder is in retracted position.

3. In a planing, shaping or like machine the alternate strokes of whose tool are working strokes and non-working return strokes, and of the type in which the tool is lifted from the work piece during the return strokes, the combination of a reciprocable tool head, a tool holder mounted on said head for movement toward and away from the work piece between a working position and a retracted position, mechanism for positively moving said holder between its two said positions in timed relation to the working and return strokes of said head, said mechanism including a non-reversible drive connection to said holder to positively hold said holder in its working position and an adjustable limit device actuated by the operating mechanism to stop the drive when the tool holder is in retracted position.

4. In a planing, shaping or like machine the alternate strokes of whose tool are working strokes and non-working return strokes, and of the type in which the tool is lifted from the work piece during the return strokes, the combination of a reciprocable tool head, a tool holder mounted on said head for movement toward and away from the work piece between a working position and a retracted position, mechanism for positively moving said holder between its two said positions in timed relation to the working and return strokes of said head, said mechanism including a non-reversible drive connection to said holder to positively hold said holder in its working position said mechanism including an electric motor and the combination also includes a pinion moved in synchronism with the movement of the tool holder, a rack moved by said pinion, an abutment moved in response to movement of said rack, and a limit switch actuated by said abutment when the tool holder reaches the retracted position, the actuation of said switch stopping the motor.

5. A combination as set forth in claim 4 wherein said abutment is adjustable in position and an external indicator is provided showing the adjustment of said abutment.

6. Tool supporting means for a planing, shaping or like machine of which alternate strokes are respectively working strokes and non-working return strokes, comprising a tool head, a tool holder movable on said head between a retracted position and a working position, means on said head against which said holder abuts in working position, a worm-wheel journalled in said head, a crank carried by said worm-wheel, means linking said crank and said tool head, whereby rotation of said worm-wheel in one direction moves said holder from retracted to working position and in the other direction from working position to retracted position, an axially movable worm meshing with said worm-wheel, spring means resisting the axial movement of said worm in the direction of reaction of the tool head when abutted in working position, a reversible electric motor coupled to said worm, and a limit switch actuated by the axial movement of said worm against said spring means which causes said motor to be stopped when said holder reaches working position.

7. Tool supporting means for a planing, shaping or like machine of which alternate strokes are respectively working strokes and non-working return strokes, comprising a tool head, a tool holder movable on said head between a retracted position and a working position, means on said head against which said holder abuts in working position, a worm-wheel journalled in said head, a crank carried by said worm-wheel, means linking said crank and said tool head, whereby rotation of said worm-wheel in one direction moves said holder from retracted to working position and in the other direction from working position to retracted position, an axially movable worm meshing with said worm-wheel, spring means resisting the axial movement of said worm in the direction of reaction of the tool head when abutted in working position, a reversible electric motor coupled to said worm, and a limit switch actuated by the axial movement of said worm against said spring means which causes said motor to be stopped when said holder reaches working position, said tool holder being slidable on said head between retracted position and working position, and a connecting rod linking said crank to said tool holder so that the tool holder is caused to slide on said head.

8. Tool supporting means for a planing, shaping or like machine of which alternate strokes are respectively working strokes and non-working return strokes, comprising a tool head, a tool holder movable on said head between a retracted position and a working position, means on said head against which said holder abuts in working position, a worm-wheel journalled in said head, a crank carried by said worm-wheel, means linking said crank and said tool head, whereby rotation of said worm-wheel in one direction moves said holder from retracted to working position and in the other direction from working position to retracted position, an axially movable worm meshing with said worm-wheel, spring means resisting the axial movement of said worm in the direction of reaction of the tool head when abutted in working position, a reversible electric motor coupled to said worm, and a limit switch actuated by the axial movement of said worm against said spring means which causes said motor to be stopped when said holder reaches working position, said tool holder being pivoted on said head and swingably between retracted position and working position, said holder having a slot therein said crank carrying a roller engaging in said slot in said holder so as to cause the holder to swing.

9. In a planing, shaping or like machine the alternate strokes of whose tool are working strokes and non-working return strokes, and of the type in which the tool is lifted from the work piece during the return strokes, the combination of a reciprocable tool head, a tool holder mounted on said head for movement toward and away from the work piece between a working position and a retracted position, mechanism for positively moving said holder between its two said positions in timed relation to the working and return strokes of said head, said mechanism including a non-reversible drive connection to said holder to positively hold said holder in its working position, said non-reversible drive connection comprises a crank arm connected pivotally to said tool holder and a crank rotatably carried by said mechanism, and said arm being pivoted to said crank at such a point that the respective pivots are substantially aligned with the axis of rotation of said crank when said tool holder is in its position of greatest advance toward said workpiece.

10. In a planing, shaping or like machine the alternate strokes of whose tool are working strokes and non-working return strokes, and of the type in which the tool is lifted from the work piece during the return strokes, the combination of a reciprocable tool head having a bearing surface thereon, a tool holder mounted on said head for movement toward and away from the work piece between a working position and a retracted position, at least a part of said tool holder engaging said bearing surface in working position, mechanism for positively moving said holder between its two said positions in timed relation to the working and return strokes of said head, said mechanism including a non-reversible drive connection to said holder to positively move said tool holder against said surface prior to the commencement of the working stroke and to hold said holder in its working position, wedge surfaces on said part of said holder and said bearing surface on the tool head, which wedge surfaces abut when the holder is in the working position thereby firmly clamping the holder, and said drive connection including a crank mechanism which is at least near a dead center position when the tool holder is in working position.

11. In a planing, shaping or like machine the alternate strokes of whose tool are working strokes and non-working return strokes, and of the type in which the tool is lifted from the work piece during the return strokes, the combination of a reciprocable tool head having a bearing surface thereon, a tool holder mounted on said head for movement toward and away from the work piece between a working position and a retracted position, at least a part of said tool holder engaging said bearing surface in working position, mechanism for positively moving said holder between its two said positions in timed relation to the working and return strokes of said head, said mechanism including a non-reversible drive connection to said holder to positively move said tool holder against said surface prior to the commencement of the working stroke and to hold said holder in its working position, wedge surfaces on said part of said holder and said bearing surface on the tool head, which wedge surfaces abut when the holder is in the working position thereby firmly clamping the holder, additional wedge surfaces between the drive connection and the tool holder which assist in clamping the holder to the head in the working position, and said drive connection including a crank mechanism which is at least near a dead center position when the tool holder is in working position.

12. In a planing, shaping or like machine the alternate strokes of whose tool are working strokes and non-working return strokes, and of the type in which the tool is lifted from the work piece during the return strokes, the combination of a reciprocable tool head having a bearing surface thereon, a tool holder mounted on said head for movement toward and away from the work piece between a working position and a retracted position, at least a part of said tool holder engaging said bearing surface in working position, mechanism for positively moving said holder between its two said positions in timed relation to the working and return strokes of said head, said mechanism including a non-reversible drive connection to said holder to positively move said tool holder against said surface prior to the commencement of the working stroke and to hold said holder in its working position, said drive connection including a crank mechanism which is at least near a dead center position when the tool holder is in working position, a self-locking worm operably coupled with said crank mechanism, means for driving said worm, means mounting said worm for axial movement, a pressure device resisting axial movement of the worm in the direction of the reaction of the holder when it is clamped in working position, and a limit device mounted to be actuated by axial displacement of the worm against said pressure device, and operably coupled with said drive means to interrupt the drive of the worm.

13. Tool supporting means for a planing, shaping or like machine of which alternate strokes are respectively working strokes and non-working return strokes, comprising a tool head having a bearing surface thereon, a tool holder movable on said head between a retracted position and a working position, said tool holder having a part engaging said bearing surface in working position, a worm-wheel journalled in said head, a crank carried by said worm-wheel, means linking said crank and said tool head, whereby rotation of said worm-wheel in one direction moves said holder from retracted to working position and in the other direction from working position to retracted position, wedge surfaces on said part of said holder and said bearing surface on the tool head, which wedge surfaces abut when the holder is in the working position thereby firmly clamping the holder, additional wedge surfaces between the drive connection and the tool holder which assist in clamping the holder to the head in the working position, an axially movable worm meshing with said worm-wheel, spring means resisting the axial movement of said worm in the direction of reaction of the tool head when abutted in working position, a reversible electric motor coupled to said worm, and a limit switch actuated by the axial movement of said worm against said spring means which causes said motor to be stopped when said holder reaches working position.

References Cited in the file of this patent
UNITED STATES PATENTS

| | | |
|---|---|---|
| 1,363,587 | Hanson | Dec. 28, 1920 |
| 2,451,371 | Backstrom | Oct. 12, 1948 |
| 2,475,577 | Berthiez | July 5, 1949 |
| 2,641,151 | Lee | June 9, 1953 |

FOREIGN PATENTS

| | | |
|---|---|---|
| 313,480 | Germany | July 17, 1919 |
| 714,455 | Great Britain | Aug. 25, 1954 |